July 27, 1965     SATAKO OZAWA     3,196,578
DOLL MAKING ASSEMBLY AND METHOD
Filed April 3, 1962     6 Sheets-Sheet 2
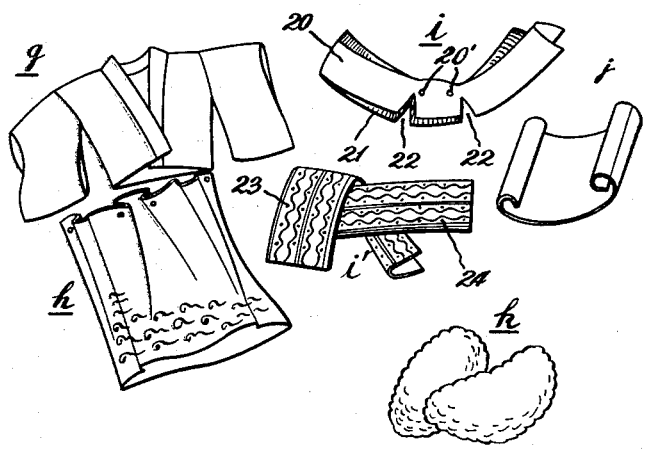
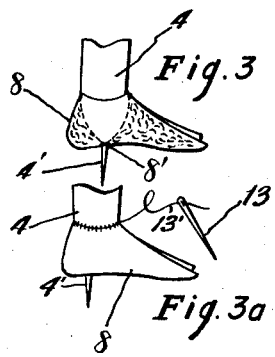
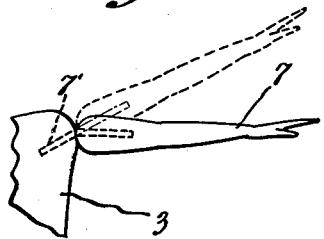
INVENTOR.
SATAKO OZAWA
BY
M. Glew and Toren
ATTORNEYS July 27, 1965  SATAKO OZAWA  3,196,578
DOLL MAKING ASSEMBLY AND METHOD
Filed April 3, 1962

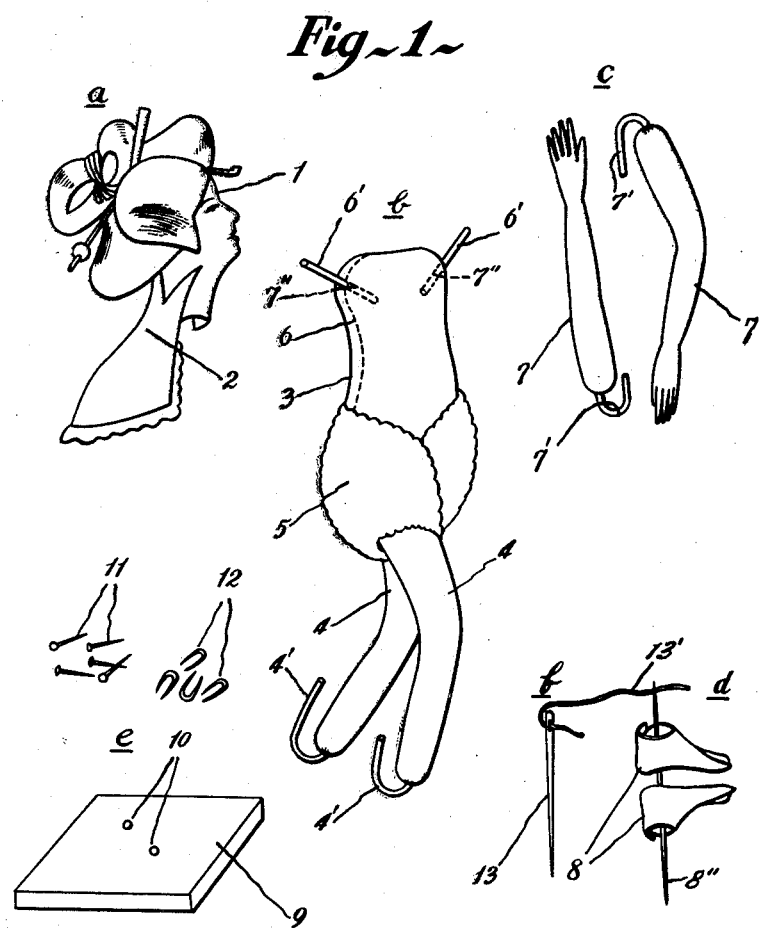

INVENTOR.
SATAKO OZAWA
BY
ATTORNEYS

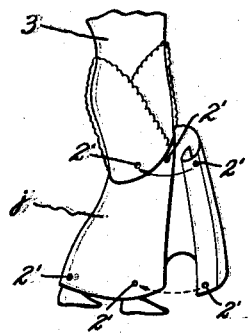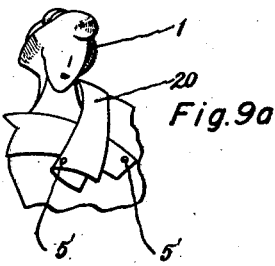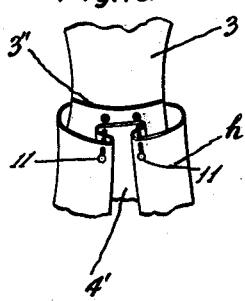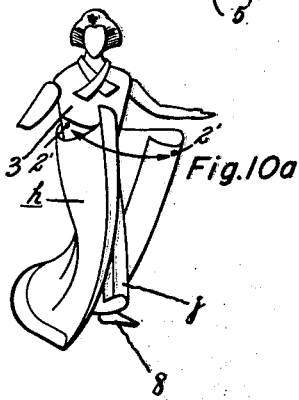

July 27, 1965  SATAKO OZAWA  3,196,578
DOLL MAKING ASSEMBLY AND METHOD
Filed April 3, 1962  6 Sheets-Sheet 5
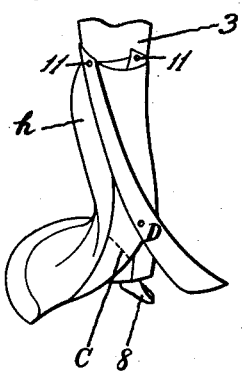
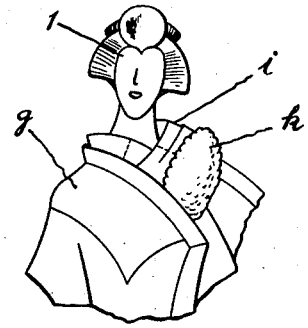
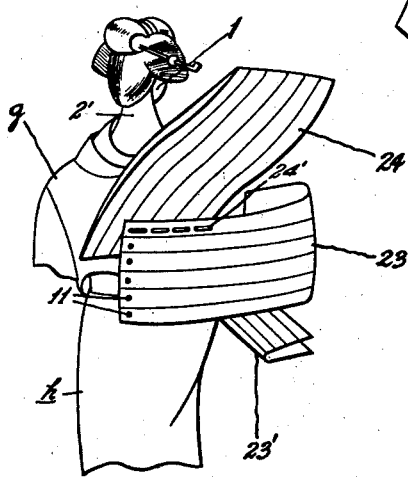
INVENTOR.
SATAKO OZAWA
BY
M. Glew and Toren
ATTORNEYS United States Patent Office 3,196,578
Patented July 27, 1965

3,196,578
DOLL MAKING ASSEMBLY AND METHOD
Satako Ozawa, 3 Akasaka Hinoki-cho, Minato-ku,
Tokyo, Japan
Filed Apr. 3, 1962, Ser. No. 184,895
7 Claims. (Cl. 46—22)

This invention relates to doll-making, and is particularly directed to the provision of a new or improved method, and an assembly of parts, for making dolls of the kind widely known, by their appearance and general style, as Japanese dolls.

Up to now, making a Japanese doll dressed in a kimono has been difficult for a layman, who even after long practice would produce incomplete or inaccurate forms; for example, the attainment of the correct inclination of the head has generally been found to be most difficult. Nowadays, as a result of the popularity of Japanese cultural tastes in other countries, a considerable demand exists for the supply of doll kits in those countries but, for the above reasons, this has not been met.

It is therefore an object of this invention to provide an assembly of parts for making a Japanese doll which may be assembled with comparative ease by one not culturally skilled in the art.

Thus, viewed from one aspect, the invention provides a method of making a Japanese doll from an assembly of parts, comprising the steps of: inserting a doll's neck with its attached head into a suitably inclined neck hole at the top of a trunk; placing a mark of the neck adjacent to another mark at an upper end of the trunk; fixing the neck to the trunk by means of pins; placing a lower part of a neck tab over the nape of the neck; fitting the neck tab on the trunk by inserting pins into a hem of the neck tab; and, bringing the corners of the neck tab toward the front to be crossed over one another and pinned together.

Viewed from another aspect, the invention provides a method of making a doll from an assembly of parts, comprising the further steps of: pinning down a collar at points on the neck; bringing around the front parts of the collar to be crossed over and pinned down onto the doll's bust; securing an inwardly pleated outer upper portion of the lower rear part of a kimono to the back of the trunk; crossing the front portions of the said lower part over one another so that guiding marks thereon are mutually aligned; and securing said front portions to the front of the trunk.

With such an assembly, as the right position in which each part is to be fixed or assembled is easily ascertained, complicated forms of Japanese dolls dressed in a kimono may easily be assembled and dressed, and it is possible to make a dressed doll of correct and proper form without any experience; and furthermore, there is no difficulty in producing not only the delicate inclination and poses of the neck and body, but also the complicated and elegant dressing of the kimono.

In order that the invention may be more readily understood, one embodiment of the same will now be described by way of example and with reference to the accompanying drawings, in which:

FIG. 1 shows, in disassembled form, parts for making the body of a Japanese doll;

FIG. 2 shows various parts of the doll's dress;

FIG. 3 is a detail of its feet inserted into one of the socks, which is shown by a vertical section;

FIG. 3a shows the same foot with the sock stitched to it;

FIG. 4 illustrates the assembly of arm and hand parts;

FIG. 8 shows a petticoat, which is half wound around the lower part of both legs;

FIG. 9 represents a back side of a red and white collar, which is fitted to the upper part of the doll body;

FIG. 9a shows a slightly squinted front side of the collar fitted to the upper part of the doll body;

FIG. 10 illustrates a back side of a lower part of the kimono which is secured to the doll body and partly cut away;

FIG. 10a shows a front side of the lower part of the kimono just before securing to the doll body;

FIGS. 11 to 14 illustrate the manners in which various parts of the doll clothing, lower and upper parts of the kimono and obi etc., are mounted.

Figure 5:
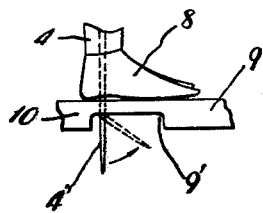
FIGS. 5 and 5a show the manner in which the doll may be mounted on a stand.

In FIG. 1, $a$ represents the neck and the head part of a doll. The head 1, having a short neck and the hair dressed in Japanese style is provided at its lower rear part with a neck tab 2 for forming a surface of a nape; $b$ represents a body part for attachment to the head $a$, and is composed of a trunk 3 and a pair of legs 4 connected thereto. Around the lower part of the trunk 3 and the upper part of the legs 4, cotton 5 is secured, thereby forming a padded portion. At each of the shoulder positions of the trunk 3 a thin wire peg 6' is inserted and projects upwardly and sideways. On both sides of the trunk 3 guiding lines 6, running approximately vertically and passing the base of the thin peg 6' are provided. The bottom parts of both legs 4 are downwardly tapered and a flexible bent hooked portion wire projection 4' projects from each. The legs 4 are slightly bent at the knee and one leg is drawn back. $c$ indicates the right and left arms 7. At the upper end of each arm 7, a flexible bent wire projection 7; similar to the wire projections 4', above-mentioned, is provided. It is preferable to have the arm 7 slightly bent at the elbow. $d$ indicates a pair of socks 8 having a thin bolt 8″ pierced therethrough, and stuffed with cotton. $e$ indicates a stand part consisting of a plate 9 having in its center a pair of holes 10 for use in fixing the feet, and several pins 11 and U-shaped nails 12. A groove is provided around the holes under the plate 9 (see FIG. 1 and FIG. 5). $f$ indicates a needle 13 and thread 13' for fixing, which is pierced through an eye of needle 13.

FIG. 2 shows parts of the kimono of a doll. $g$ indicates the upper part of the kimono, and $h$ indicates the lower part thereof. $i$ indicates a collar composed of a piece of white outer cloth 20 and a piece of red inner cloth 21, each of which is folded double and has at its back a pair of slits 22 opening downwards. $i'$ indicates the obi or wrap composed of a part 23 which is intended to be wound around the body and a part 24, which is connected to the part 23. The small circle 20' in collar $i$ and the lower part $h$ of the kimono are mark prints for pinning down the collar and kimono. $j$ is a petticoat and $k$ is the cotton to be spread on the outside of the collar $i$, thereby forming a further padded portion.

To make up a doll from the above described parts, the procedure is as follows. Firstly, the thin bolt 8″ which is pierced through the socks is extracted (see FIG. 1 and FIG. 3), and each wire 4', which has been extended at this time from the end of each foot is inserted into a sock through the hole 8' in the bottom thereof. The wire must be fully drawn out of the sole of the sock so as to bring the end of the foot to the bottom thereof. The meeting line of the upper end of the sock and the foot, and the joining line in the sock itself, are then stitched together with the needle and thread 13, 13'. The thin bolts or pegs 6' are then extracted from both shoulders, and the arms 7 are fixed on the shoulders by inserting the shoulder wires 7' thereof into the holes 7'' from which the pegs 6' have been removed. The arms 7 now project upwards from the shoulders as shown by the dotted line in FIG. 4; the arms are now pushed down to the position shown in solid lines in FIG. 4 so that they project almost horizontally; the shoulders and arms are then stitched together.

Figure 5A:
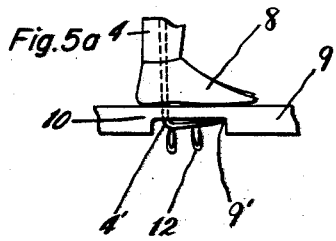

The wire 4' projecting from the bottom of each sock is inserted into the corresponding hole 10 in the stand 9 (see FIG. 1 and FIG. 5) so that it projects from the underside of the stand, and is bent back and secured firmly within the groove 9' under the stand by means of staples 12 (see FIG. 5a).

Figure 6:
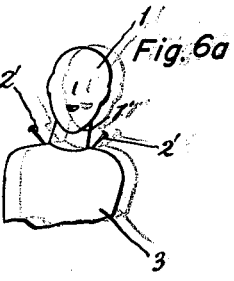
FIG. 6 shows the assembly manner of head and neck parts, in which a neck tab is not shown, when these parts are not inserted into a hole of a trunk of the doll.

As shown in FIG. 6, the neck 1', with its attached head 1, is inserted a short distance into the corresponding inclined neck hole 3' at the top part of the trunk 3. The inside of the neck hole 3' is glued in advance and the lower end of the neck part is then inserted into the neck hole, placing the mark A adjacent the mark B at the upper end of the guiding line on the trunk; the neck is then fixed to the trunk by means of pins (see FIG. 6a).

Figure 7:
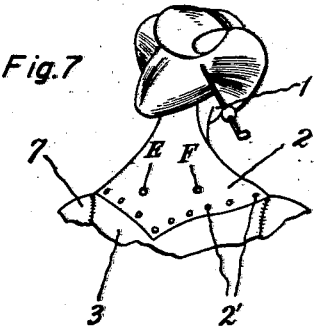
FIG. 7 illustrates a back side of a neck piece with the head and neck parts, which is fitted to the trunk.
Figure 7A:
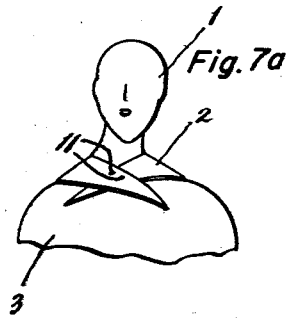
FIG. 7a is a front side of the neck piece fitted to the trunk with the head and neck parts, the hair of which is omitted.

The lower part of the neck tab 2 is then placed over the nape (see FIG. 7) and fitted on the trunk by inserting pins 2' into the hem of the neck tab; the corners of the neck tab are then brought toward the front, crossed over one another, and pinned together (see FIG. 7a).

Figure 6A:
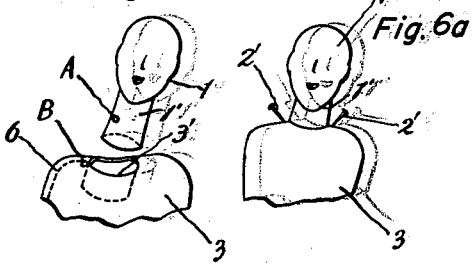
FIG. 6a is the same assembly manner as shown in FIG. 6, when the head and neck parts, in which a neck tab is not shown, are inserted into the hole of the trunk.

In FIGS. 6, 6a and 7a, the hair part is omitted.

As shown in FIG. 8 a petticoat j is wound around the lower part of both legs and its corresponding mark points are overlapped with each other and then pinned into the legs. The bottom hem of the petticoat is made to reach almost to the ankles.

The pins 11 pierced through the suitable mark points 20' of the red and white collar parts 20 and 21 are then pinned down at the points marked E and F on the neck tab. The corners of the collar are brought around the front, crossed over and pinned down on the bust (see FIGURES 7, 9, and 9a).

As shown in FIG. 10a, the outside of the petticoat is covered by the lower part of the kimono h. Around the waist of trunk 3, a waist line 3'' is marked at the appropriate position, the upper end of the lower part of the kimono being placed on this waist line. The back of the lower part of the kimono is pinned by pins 11 to the trunk with the pleated part 4' thereof in the center, and the two front upper parts are crossed over and secured with pins at the mark prints 2' (see FIGS. 10, 10a). The guiding line C, marked obliquely on the inner front of the lower part of the kimono to show the crossing line, is then placed almost in the center of the lower front region of both legs (FIG. 11), and the outer front of the lower part of the kimono is then superimposed on the inner front thereof so that point D (which may be marked in advance) on the lower part of the outer front is aligned with the guiding line C.

Figure 14:
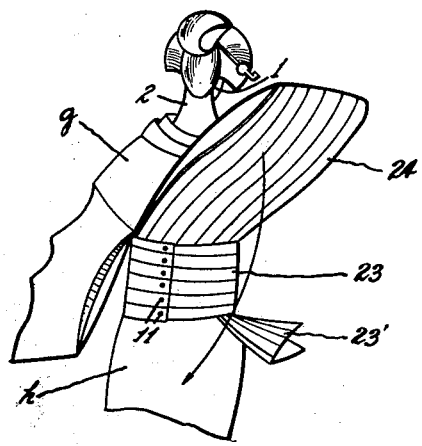
Figure 15:
FIGS. 15 and 16 show a completed doll and a modification thereof.
Figure 16:
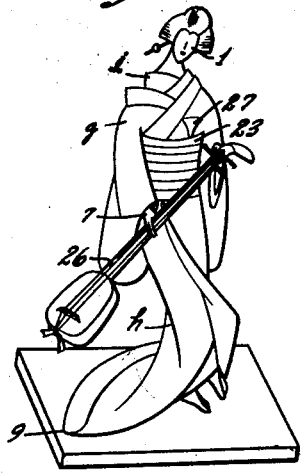

The cotton k is then spread around the lower part of the collar on which the upper part g of the kimono is placed. (See also FIG. 12.) Both arms 7 must, of course, be passed through the sleeves of this upper part of the kimono. The front parts of the upper part of the kimono having been crossed over each other, each is pinned at points 5' marked in advance on the respective lower corners of the collar (FIG. 9a); a string (not shown) is then wound around this region and tied firmly at the bust of the doll. The waist part of the obi or wrap 23 is then wound around the trunk of the doll. 23' is the other end of the obi or wrap (see FIG. 13 and FIG. 14). As shown at FIG. 13, to effect this one end of the obi or wrap is pinned on the back of the trunk and the other end, having been wound around, is also pinned on the back of the trunk. The projecting part 24 of the obi or wrap is then hung at the back of the doll (FIG. 15). This projecting part 24 is stitched to the waist part of the obi at the stitch line 24' (see FIG. 13). The assembly of the doll is now almost completed. The doll made in this way may be posed in any way as wished by the maker by having the arms positioned at any level. It can be made to hold a fan 25 as shown in FIG. 15 or, provided with a musical instrument 26 as in FIG. 16, keeping the Bachi or plastrum 27 between the obi or wrap and the upper part of the kimono.

The above mentioned marks A, B, C, D, and E are provided in advance at their appropriate positions.

It will thus be seen that I have provided an assembly of parts whereby one not skilled in the art of Japanese doll-making can construct a correctly-formed doll with very little, if any, practise.

What I claim is:

1. A Japanese doll assembly comprising: a head including a doll's face having features characteristic of a Japanese female and having a hairpiece characteristic of a Japanese female's coiffure, said head including a neck attached thereto, said neck having an alignment mark thereon; a torso having a stuffed lower portion defining the doll's rump and hips and an upper portion defining the doll's back, bust and shoulders, said upper portion having an inclined hole therein for receiving an end portion of said neck, said torso having an alignment mark thereon whereby said neck's alignment mark is alignable with said torso's alignment mark when said neck is received in said inclined hole so that said head and neck are arranged in a predetermined inclination with respect to said torso, each shoulder of said torso having a hole defined therein; a pair of arms each having a hand formed at one end thereof and having a wire projection extending from an opposite end thereof, said wire projections being receivable in the respective shoulder holes for attaching said arms to said torso; a pair of legs integral with said torso's lower portion and extending therefrom; a pair of stuffed socks defining the doll's feet attachable to the respective ends of said legs; a pedestal for said doll; pin means associated with said stuffed socks for securing said doll on said pedestal; and clothing for said doll comprising a petticoat for covering the lower portion of said torso and said pair of legs, a collar for covering the upper portion of said torso and shoulders, a kimono for covering the upper and lower portions of said torso and said legs, and an obi adapted to be draped around said kimono to cover a substantial portion of said doll's upper torso portion.

2. A doll assembly comprising: a head; a neck attached to said head and having at least one mark thereon; a torso having a lower portion, padded to define the doll's rump and hips, and an upper portion defining the doll's back, bust and shoulders, said upper portion having a hole therein for receiving an end of said neck, said torso having at least one mark thereon, said torso's mark being alignable with a mark on said neck whereby said head and neck are arranged in a predetermined orientation with respect to said torso when said neck is received in said hole in said upper portion of said torso, each shoulder of said torso having a hole defined therein; a pair of arms each having a hand formed at one end thereof and having a wire projection extending from an opposite end thereof, said wire projections being receivable in the respective shoulder holes for attaching the arms to said torso; a pair of legs integral with the torso's lower portion and extending therefrom; a pair of stuffed socks defining the doll's feet attachable to the respective ends of said legs; a pedestal for said doll; pin means associated with said stuffed socks for securing said doll on said pedestal; a neck tab adapted to be draped over a nape formed at the top part of the torso and having corners adapted to be crossed over the front part of the torso and secured thereto, the back portion of said neck tab having positioning marks thereon; and clothing for said doll comprising a collar alignable with said positioning marks on said neck tab, a petticoat adapted to be wrapped around the lower portion of said torso, a kimono, and an obi; said kimono including a lower part having alignment marks spaced therearound and arranged to be aligned in overlapped relation to form pleats.

3. The doll, according to claim 1, wherein said collar includes alignment marks thereon, alignable with said positioning marks on said neck tab, for enabling said collar to be draped in a predetermined arrangement about the upper portion of said torso.

4. The doll, according to claim 1, wherein said torso and said kimono include alignment marks thereon to facilitate the draping of said kimono on said doll in a predetermined arrangement.

5. A method of making a Japanese doll from an assembly of parts, comprising the steps of providing a neck with an attached head, and providing a trunk having a suitably inclined hole at the top part, aligning a mark on the neck adjacent to another mark on the upper end of the trunk, inserting the lower part of the neck into the neck hole of the trunk, fixing the neck to the trunk by means of pins, placing a neck tab, having corners, over a nape formed at the trunk's top part, fitting the neck tab on the trunk by inserting pins into a hem of the neck tab and bringing the corners of the neck tab toward the front of the doll to be crossed over one another and pinned together.

6. The method according to claim 5 comprising the further steps of pinning down a collar at predetermined points on the neck tab, bringing around the front parts of the collar to be crossed over and pinned down on to the doll's bust, securing an inwardly pleated outer upper portion of the lower rear part of a kimono to the back of the trunk, crossing the front portions of the said lower rear part over one another so that guiding marks thereon are mutually aligned and securing said front portions to the front of the trunk.

7. A method of making a Japanese doll from an assembly of parts, comprising the steps of inserting a neck into a neck hole at the top part of a trunk, placing a mark of the neck adjacent to a mark at the upper end on the trunk, fixing the neck to the trunk by means of pins, placing a neck tab, having corners, on the neck and over a nape on the trunk, fitting the neck tab on the trunk by inserting pins into a hem of the neck tab, bringing the corners of the neck tab toward the front to be crossed over one another and pinned together, pinning down a collar at predetermined points on the neck tab, bringing around the front parts of the collar to be crossed over and pinned down on the bust of the trunk, securing an inwardly pleated center upper portion of the lower rear part of a kimono to the back of the trunk, crossing the front portions of the said lower part of the kimono over one another so that guiding marks thereon are mutually aligned, and securing said front portions of the kimono to the front of the trunk.

References Cited by the Examiner

UNITED STATES PATENTS

| | | | |
|---|---|---|---|
| 1,460,700 | 7/23 | Buffington | 46—22 |
| 2,144,751 | 1/39 | Brown | 46—22 |
| 2,169,682 | 8/39 | Duncan | 46—22 |
| 2,289,858 | 7/42 | Angrave | 46—22 |
| 2,506,328 | 5/50 | Alger | 46—22 |
| 2,964,873 | 12/60 | Risler | 46—157 X |
| 2,996,832 | 8/61 | Rubin. | |
| 3,090,157 | 5/63 | Lohr | 46—157 |

FOREIGN PATENTS 361,936   2/22   Germany.

DELBERT B. LOWE, *Primary Examiner.*